United States Patent [19]

Schön

[11] Patent Number: 5,690,431

[45] Date of Patent: Nov. 25, 1997

[54] GUIDE SYSTEM FOR GUIDING A MOVABLE ELEMENT ALONG A PREDETERMINED ELONGATED PATH

[75] Inventor: Uwe Schön, Schönaich, Germany

[73] Assignee: Neff Antriebstechnik Automation GmbH, Waldenbuch, Germany

[21] Appl. No.: 566,793

[22] Filed: Dec. 4, 1995

[30] Foreign Application Priority Data

Dec. 17, 1994 [DE] Germany ............... 44 45 132.6

[51] Int. Cl.$^6$ .................. F16C 33/74; F16C 29/12
[52] U.S. Cl. .................. 384/15; 384/37; 384/40
[58] Field of Search .................. 384/15, 21, 37, 384/40

[56] References Cited

U.S. PATENT DOCUMENTS

| | | |
|---|---|---|
| 4,878,390 | 11/1989 | Hauser . |
| 4,887,477 | 12/1989 | Hauser et al. . |
| 5,330,270 | 7/1994 | Ohmori ................ 384/37 |

FOREIGN PATENT DOCUMENTS

| | | |
|---|---|---|
| 90 06 043 | 9/1990 | Germany . |
| 3-4005 | 1/1991 | Japan . |
| 183 271 | 4/1935 | Switzerland . |

*Primary Examiner*—Daniel P. Stodola
*Assistant Examiner*—Matthew A. Kaness
*Attorney, Agent, or Firm*—Frishauf, Holtz, Goodman, Langer & Chick, P.C.

[57] ABSTRACT

To prevent elongation of a covering tape or ribbon (25) extending over an elongated opening (34) in an elongated base body (2) over which a movable element (3) can slide, the tape or ribbon is retained at preferably both of its ends, by a reverse motion, or one-way lock (50,52). In the simplest form, this reverse-motion lock (50,52) is formed by a leaf spring (63) extending at an acute angle with respect to the tape or ribbon; the tape or ribbon is backed up by bridge-like counter element (54) bridging over the elongated opening (34). If the tape or ribbon stretches, for example due to friction upon movement of the movable element (3) heating, or aging, and the movable element pushes the tape or ribbon in form of a bulge towards a terminal position, it can slide beneath the leaf spring and extend over an end portion of the base body; upon reverse motion of the movable element, the elongated end cannot, however, slip because of the one-way locking feature, thus retaining the tape or ribbon (25) taut against the opening (34) and effecting a good seal to prevent egress of operating fluid, as well as ingress of contamination, such as dirt, extraneous oil or the like.

20 Claims, 2 Drawing Sheets

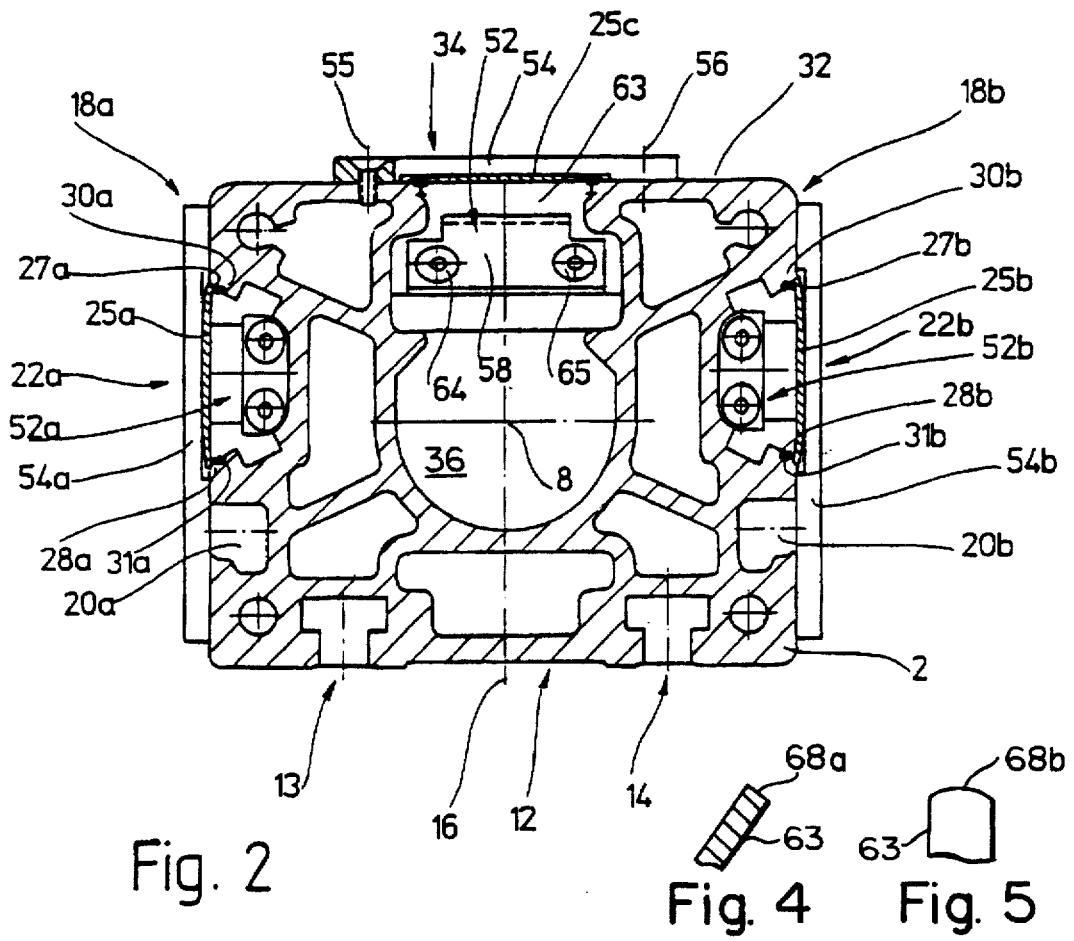
Fig. 2
Fig. 4  Fig. 5
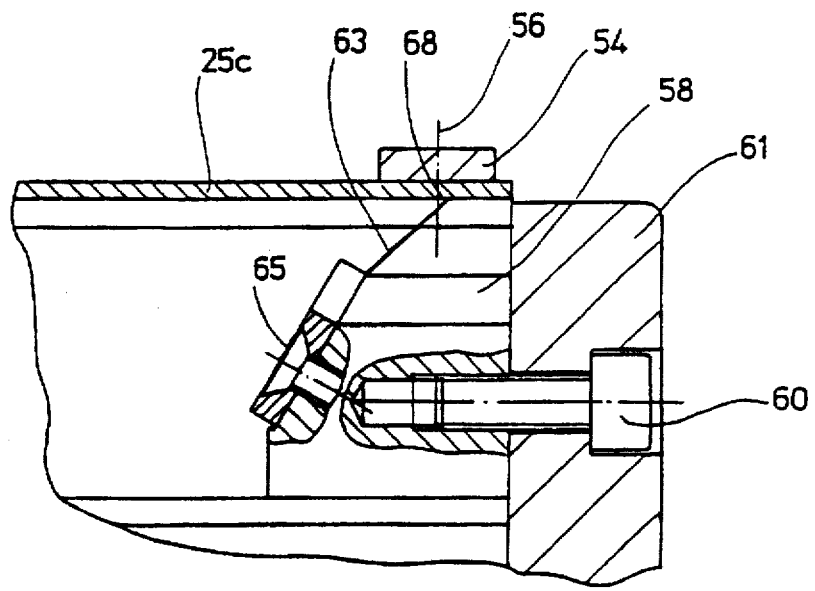
Fig. 3

GUIDE SYSTEM FOR GUIDING A MOVABLE ELEMENT ALONG A PREDETERMINED ELONGATED PATH

Reference to related patents, the disclosures of which are hereby incorporated by reference:

U.S. Pat. No. 4,878,390, Hauser (attorney docket 88859-shf; PA 12 USA sg);

U.S. Pat. No. 4,887,477, Hauser et al (attorney docket 88860-shf; GM 2 USA sg).

FIELD OF THE INVENTION

The present invention relates to a guide system to guide a movable element along a predetermined path. This path may be straight, bent, or, for example, part-circular. A base body, typically a hollow body, carries the movable element for example in the form of a sled or carriage. A motion transmitting power element can be coupled to the base body to cause the movable element to be moved along the path, as determined by the base body. A coupling element extends from the carriage through one or more slits in the base body. The slit must be closed towards the outside, typically by tape or ribbons.

BACKGROUND

Linear motion transmitting elements of the type to which the present invention relates usually provide for mechanical coupling between a sled or carriage and the base body, on which the sled or carriage is linearly, movably supported. A drive system, coupled to the base body, connects with a connecting element, forming the movable element which, in turn, is coupled to the sled or carriage. The drive system may be a spindle drive or the like, or a hydraulic piston-cylinder arrangement, in which the base body may, itself, form one part of the hydraulic system, for example the cylinder. To provide for mechanical coupling between the drive system and the power source, for example a spindle, a sprocket belt, or the like, or a piston, and a linearly movable carriage, the base body is formed with a longitudinal slit so that the coupling arrangement can pass through the slit into the interior of the base body. Dirt, cutting chips, oil, or other contaminants, must be prevented from entering through the slit, which is formed as an elongated opening, and there penetrate into the interior of the base body. To prevent such contamination, a flexible cover tape or ribbon is provided which extends along the slit from its ends and through a guide region, formed on the sled. The cover tape or ribbon can be coupled at its two ends to the base body by a clamping arrangement, which retains the tape or ribbon in axially predetermined, non-shiftable position.

If the drive arrangement is a fluid operated piston-cylinder arrangement, and the base body forms the cylinder, the longitudinal slit is outwardly covered over by not merely a cover tape or ribbon, but by a sealing tape.

The cover tape or ribbon, or the sealing tape or ribbon, respectively, usually are made in the form of a plastic tape which covers the slit in regions beyond the carriage. Preferably, interengaging arrangements are provided to hold the tape on the slit. In the region of the coupling or connecting element, the carriage is formed with an arrangement to lift the cover tape from the slit radially outwardly and guide it through a passage duct in the region of the connecting element. The sealing tape is lifted radially inwardly from the longitudinal slit. The carriage rides along the base body and guides the tape or ribbon, which slides within the duct of the carriage, while the tape or ribbon is secured to the base body at its ends. In operation, the tape is lifted up off the slit in the direction of travel of the carriage, and then replaced over the slit behind the carriage. Interlocking holding ridges or the like may be provided in order to lock the tape to the base body. A substantial axial force is applied on the tape or ribbon during this lifting off and replacement cycle of the ribbon. Friction arises between the ribbon and the guide portions of the carriage in the region in which the ribbon is passed therethrough. This friction cannot be entirely avoided. The friction may lead to heating of the ribbon, particularly if the carriage, in operation, rapidly carries out operating movement in the course of the work which it is commanded to do.

The two parameters which particularly affect the ribbon, namely heating of the ribbon and the axial force which is applied along the longitudinal extent thereof, may lead to temporary as well as permanent elongation of the ribbon. In due course, or from time to time, it may not adhere tightly on the slit or opening in the base body. The carriage, during its axial movement, will then push a radially projecting, outwardly bulged, bunched-together portion of the ribbon, in the form of a wave or forward bulge. If this occurs, the protection for the interior of the base body desired by the cover ribbon is no longer effective, and absence of contamination by dust, dirt, oil or the like, can no longer be assured. If the tape or ribbon is a sealing tape, it no longer seals the longitudinal slit against ingress or egress of fluid.

THE INVENTION

It is an object to improve a guide system of the type described which operates reliably, even after long term and over many to-and-fro operating cycles, while maintaining protection against contamination, or a seal to the interior of the base body.

Briefly, a reverse-motion lock is provided, located adjacent at least one of the ends of the base body, that is, at the end of the motion path, holding and engaging the tape or ribbon, and operative to permit shifting of the tape or ribbon with respect to the lock in a first direction in which the tape is free to extend beyond the operating path, while inhibiting shifting of the tape or ribbon in the second or reverse direction, Opposite to the first direction, and blocking movement of the tape or ribbon with respect to the base body in the second direction.

This one-way lock is suitable for any kind of guide system, for example a linear guide system, in which a carriage is guided by suitable guide elements, for example a coupling element, along a linear path on a base body formed with a slit or opening through which a coupling element to the carriage extends. The carriage may be driven, or freely running, and providing only guidance along the path. The guide system may be used, for example, to guide a movable element to be moved along a linear, or curved path. The movable element only determines the path of, for example, a secondary device coupled thereto. The device, if it is self-movable, then forms a pure guide system, in which the guide path is determined by the base body, and/or the slit or opening therein. The device, coupled to the carriage can then be guided in a straight path or, for example, along a curved slit or opening in the base body, which can be opened in radial direction. The system can also be used, however, as a drive unit to, itself, move a device, coupled to the carriage.

Regardless of the use or specific arrangement for which the system is intended, the slit formed in the base body is covered by a tape or ribbon which is retained with its two free ends at the ends of the path of the movable element. The ribbon or tape is secured at least at one end by the reverse motion, or one-way lock. In operation, the tape or ribbon can be pushed through the lock relatively easily, that is, against some, but rather small friction. This motion is in axial direction, the tape being moved by friction with the movable element, that is the carriage, so that it can be pushed beyond the end of the path. Reverse motion, however, that is, withdrawal of the tape through the lock, is normally blocked, that is, not possible under normal conditions. Generally expressed, the reverse-motion lock, or one-way lock, provides substantially less resistance of the tape or ribbon in a direction away from the movable element than axial movement towards the movable element.

Constructing the attachment of the tape or ribbon at the end of the base body in form of a one-way lock has the effect that a tape or ribbon which became elongated after substantial use, for example by heating, material fatigue, or similar effects, can be pushed by the movable element through the lock, and is then held in a new locked position, and hence, upon reverse movement, again tensioned. Upon a return run of the movable element, the tape or ribbon can no longer be withdrawn from the one-way lock, so that the band or ribbon will be stretched taut and tightly held on the base body. Formation of a bulge at the end of a stroke of the movable element is reliably prevented. This is true even if friction between the ribbon and the guide path thereof through the movable element is increased, for example due to deposition of contaminants or dirt, and results in an increased axial force being applied on the ribbon, which, also, may lead to increased heating of the ribbon. Excessive elongation of the ribbon is reliably compensated by the one-way lock, forming one hook end of the ribbon holding structure for the entire system. The invention is equally applicable also to other systems in which ribbons or the like have to be held in position and although they have a tendency to elongate in use, for example over time.

The reverse-motion or one-way lock holds the ribbon on the base body in lateral direction, that is, with respect to the longitudinal extent of the base body in circumferential direction, as well as in radial direction of the base body. Additional attachment arrangements to retain the tape or ribbon at the ends of the base body are not required, the one-way lock itself forming an attachment for the tape or ribbon on the base body.

In some installations, it may be sufficient to use the one-way lock only at one end of the travel path of the carriage. Generally, however, it is preferred to supply two reverse-motion locks, one at each end of the base body. If two locks are provided, the movable element, at each operating cycle, will cause tensioning of the ribbon or tape, independently of the direction in which the carriage moves. If only one one-way lock is provided at one end, tensioning of the ribbon will be effective only when the movable element moves towards the one-way lock.

The reverse motion, or one-way lock can be formed as a mechanical element which is directly secured to the base body or by means of suitable intermediate elements. It is only important that the reverse-motion lock acts, or is effective between the base body and the tape, so that axial movement of the tape or ribbon with respect to the base body is either permitted or blocked, independent on the direction of movement of the movable element or the tape or ribbon, respectively. The base body can be a single element or be constructed of several parts.

Preferably, the reverse-motion lock is so constructed that it operated essentially without play. This means that it is not possible for the ribbon to be drawn backward against the lock, even for a small distance, after the ribbon has been pushed through the lock in a forward direction. Play would be provided if the reverse-motion lock would operate similar to a ratchet tooth on a ribbon which is toothed or ribbed. It is possible to use such a construction, but for most purposes, it is preferred to use a reverse-motion lock which operates without play and, that is, is essentially stepless. Thus, even if only small elongation of the ribbon occurs, such small elongation, nevertheless, can be compensated for by a step-less construction. Even small elongations, thus, can be accepted and rendered ineffective with respect to tight stretch or fit of the ribbon over the slit or opening of the base body.

In accordance with the preferred embodiment, and which is particularly simple and effective, the reverse-motion lock is formed by a leaf spring which is retained adjacent one end of the operating path of the movable element in position on the base body. The other end of the leaf spring engages the ribbon, with some spring bias. The leaf spring is oriented to include, with respect to the longitudinal extent of the ribbon, an acute angle, open in the direction towards the carriage. If this acute angle is substantially greater than, for example, about 45°, the ribbon is highly pressed against a counter surface, for example, formed on the base body. If the angle is substantially less than 45°, the engagement force is small, although the free end of the leaf spring engages the ribbon and will have a tendency to dig itself into the ribbon and thus block its movement in the reverse direction. If the acute angle is approximately 45°, the notching effect, as well as the engagement force, is obtained and thus an angle of about 45° is preferred. The friction between the ribbon and the counter element substantially increases the holding and reverse motion blocking effect.

DRAWINGS

FIG. 2 shows a guide system according to FIG. 1, cut along the section line II—II to a larger scale;

FIG. 3 is a fragmentary view of the guide section within circle C of FIG. 1 to a still larger scale, and illustrating one construction of a reverse-motion lock;

FIG. 4 is a fragmentary view of the end of a leaf spring shown in FIG. 3, and

FIG. 5 is a fragmentary top view of a leaf spring and showing a modification, in which the rounding of the edge is highly exaggerated for purposes of illustration.

DETAILED DESCRIPTION

Figure 1:
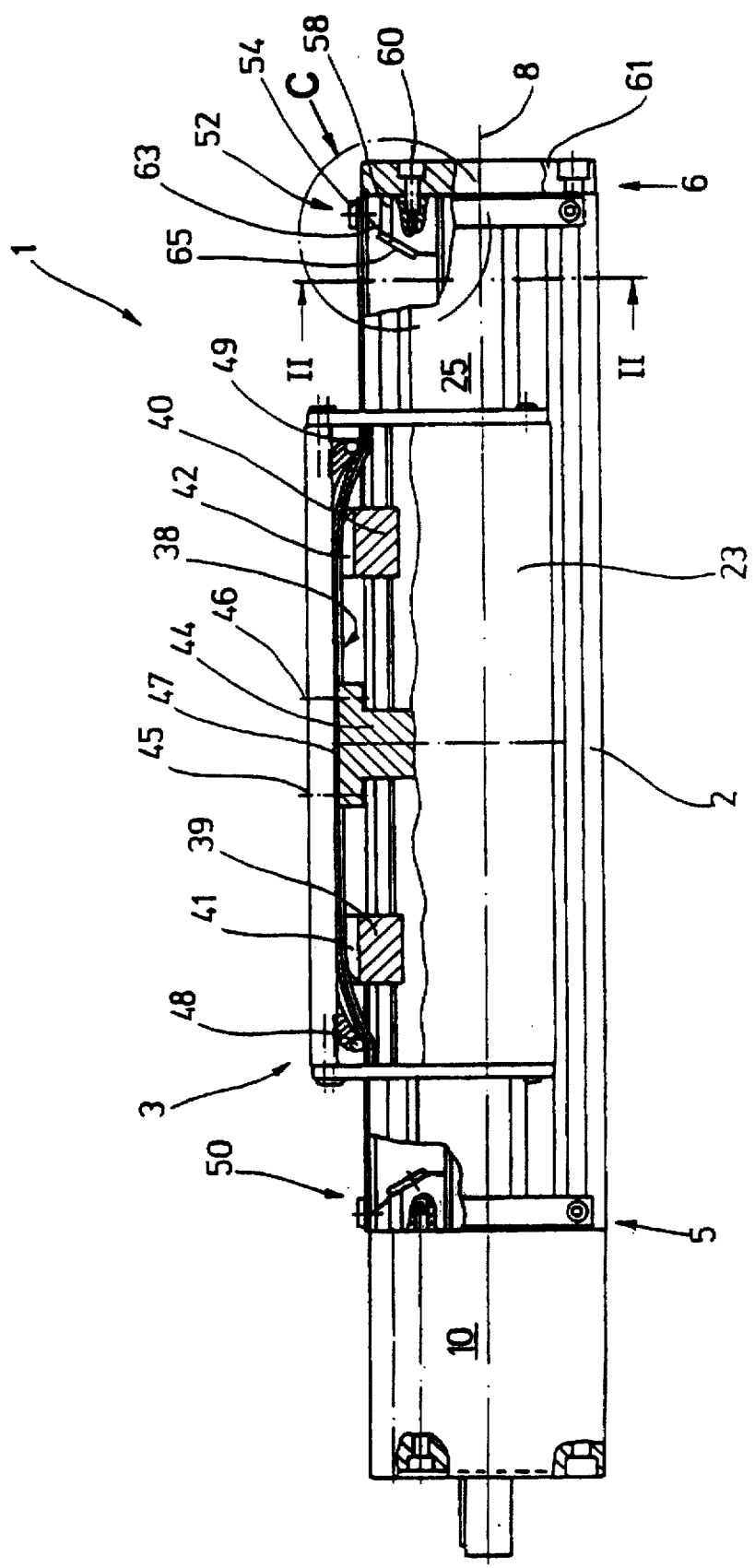
FIG. 1 is a highly schematic longitudinal side view, partly in section, of a linear drive system having three cover ribbons, each held in a respective reverse-motion lock. The illustration is to a highly reduced scale and partially broken open.

FIG. 1 illustrates, in highly schematic form, a driven linear guide system 1. A sled or carriage 3 is longitudinally movable along a elongated base body 2. The outer shape of the base body 2 is approximately block-shaped; it is terminated at its ends by a left-end face 5, and a right-end face 6. A linearly extending guide path is defined between the two ends 5, 6, extending along a longitudinal central axis 8 of the base body 2, along which the movable element formed by the carriage 3 can move. The carriage 3 is, in cross-section, generally U-shaped and fits over and partly surrounds the base body 2 at three sides. It is longitudinally movable with as little play as possible on the base body, that is, movable along the direction of central axis 8. The carriage 3 can accept transfer of forces and transfer them to the base body 2.

If it is desired to move the carriage 3 by force transfer thereto from the system 1, a drive system 10 is located at one of the end sides, in FIG. 1 at the left end side 5 of the base body 2. The drive system 10 is shown only schematically, since it is well known and may be of any suitable type. For example, it may be a spindle drive having a spindle extending longitudinally interiorly of the hollow base body, cooperating with a spindle nut (not shown), which is coupled to the carriage 3.

Referring now to FIG. 2, which illustrates a cross-section along line II—II of FIG. 1 to an enlarged scale: the base body 2 has a base surface 12 in which two parallel T-grooves 13, 14 are worked, to secure the base body to a work table, or to another base surface. The T-grooves 13, 14 extend parallel to the longitudinal axis 8. The base surface 12 is not engaged by the carriage. The base body 2 can be made as an extruded rail or the like, for example of aluminum, and defines a plane of symmetry 16 extending at right angles to the base surface 12, and including the central axis 8. Other material than aluminum may be used for the base body, for example steel, plastic, or yet other materials, in dependence on forces to be transferred, the purposes of the system, and environmental conditions in which it is to operate.

Since the base body is symmetrical about the plane of symmetry 16, only the left half thereof will be described in detail; the right half is mirror symmetrically identical. The same reference numerals have been used for features which will be described in connection with the base body at either side; to distinguish the left side and the right side, the reference numerals have been supplied with the addition of a and b, respectively. In a description, Usually only the numerical designation will be used, it being understood that the left and right sides have the respective letter designations added.

A side surface 18 is provided, parallel to the axis of symmetry and extending at right angle to the base surface 12. The side surface 18 includes a L-shaped longitudinal groove 20, extending parallel to the longitudinal axis 8. A further groove 22 is provided, parallel to the longitudinal groove 20 and the longitudinal axis 8. The grooves 22 are overlapped by a leg 23 (FIG. 1) of the carriage 3. The grooves 22 are covered by a cover tape or ribbon 25. Bearing surfaces are located in the interior of the groove 22, engaged by bearing elements on the carriage 3 which also lift the cover ribbon 25 from the groove 22. The bearing elements are coupled to the respective leg 23 of the carriage 3.

The cover tape or ribbon 25 is an essentially flat, flexible ribbon of plastic material. The cover ribbon is formed at the lower edge with an engagement projection or lip 27, and at its lower edge with a similar engagement projection or lip 28. The lips 27, 28 fit in matching grooves 30,31 formed in the flanks of the groove 22.

The side surfaces 18a, 18b are connected by the base body. The cover surface 32 may be continuous at the end portions; otherwise, it is formed with a longitudinal opening in form of a groove or slit 34, positioned longitudinally and symmetrically with respect to the axis of symmetry 16. The slit 34 leads to an enclosed inner space 36 formed in the base body, which, thus, is partly hollow. The groove 34, as described in connection with the grooves 22a, 22b, is also covered by a ribbon or tape 25c, which can be identical to the cover tapes or ribbons 22a, 22b and features which correspond to the grooves 34, and the tapes, and which are identical to the grooves 22a, 22b and tape 25, therefore, have been given the same reference numerals, with the alphabetical addition of c for the top tape or ribbon.

The cover ribbon 25c, as best seen in FIG. 1, is guided through a guide region 38 formed in the carriage 3. In this guide region, the cover ribbon 25c is lifted from the groove 34. The cover ribbon 25c is guided through suitable slits 41,42 formed in the bearing elements 39, 40 of carriage 3. The bearing elements 39,40 thus essentially surround the ribbon 25c as it is lifted out of the grooves 25, 34 upon longitudinal movement of the carriage 3. A connecting element, formed, for example, as a force transfer ridge or strip 44, is secured to the carriage 3 by screws 45,46, shown schematically only. It is used to permit transfer of power from a spindle nut surrounding a spindle located in the interior of the base body to the carriage 3, or another suitable linear motion drive.

The top cover ribbon 25c is retained outside of the carriage 3 in the groove 34 by engagement of two pressure rollers 48,49 against the upper surface of the ribbon. The pressure rollers 48, 49 are located adjacent the end surfaces of the carriage 3.

The top cover ribbon 25c, located in the grooves 34 and held therein, is retained adjacent the end edges 5,6 of the base body in suitable holder arrangements.

In accordance with the invention, the holder arrangements are formed as reverse motion or one-way locks 50,52, located at the respective end surfaces 5,6 of the base body 2.

Both reverse motion or one-way locks 50,52 are identical, and arranged mirror symmetrically with respect to each other.

Only the right side lock 52, therefore, will be described. The reverse-motion lock 52, as best seen in FIG. 2, includes a bridge 54, forming a counter element or abutment or anvil surface for the top cover ribbon 25c. The bridge 54 bridges over the groove 34 and is secured to both sides thereof by screws 55,56 on the base body. A holding block 58 is fitted in the groove 34 at the side of the ribbon 25 remote from the bridge 54 by screws 60, passing through an end cover 61 secured, in turn, to the base body 2 in any suitable body.

In accordance with a feature of the invention, a leaf spring 63 is clamped at one end on the block 58 by screws 64, 65 to form the locking element of the one-way lock 52.

The leaf spring 63 engages the top cover ribbon 25c at an acute angle of about 45° with respect thereto, with some bias force being applied against the ribbon 25c. This bias force presses the ribbon 25c against the bridge 54, forming a counter element for the leaf spring 63. The ribbon 25 is located in a generally circular swing region formed by the free edge of the leaf spring 63. The leaf spring 63 engages the ribbon 25c roughly in the middle of the bridge 54. Preferably, the leaf spring 63 is offset by about 1 mm with respect to the center of the bridge 54, defined by the center between the screws 55,56, in the direction towards the end cover 61. The end of the leaf spring 63 engaging the ribbon 25c is formed with a relatively sharp edge 68 which can dig into the ribbon 25c.

The edge 63 is defined by a section line through the flat surface of the leaf spring 63 with a surface defined by the thickness of the leaf spring, that is, at its end face. In the simplest manner, the end face of the leaf spring 63 extends at a right angle to the flat side of the leaf spring 63, as shown by edge 68a in FIG. 4. It may, however, also be formed in an acute angle, which increases the digging-in and holding effect of the leaf spring with respect to the ribbon 25c.

The cover 61 is so dimensioned and shaped that the ribbon 25a,25b,25c, respectively, can freely extend beyond the end surfaces 5,6 of the base body 2 without bumping against, or impinging on the cover 61.

Reverse-motion locks identical to those described in connection with lock 52 can also be located at the ends of the grooves 22a, 22b at both end surfaces 5, 6. Holder arrangements 50, which can be termed 50a,50b for the respective sides, can be arranged to hold the ribbons 25a,25b located in the grooves 22a, 22b, constructed in mirror symmetrical form, that is, with leaf springs inclined away from the carriage 3. For a linear guide system as described, six reverse-motion locks are preferably used for the three cover ribbons 25a,25b,25c; three reverse-motion locks 50 would be located at the left side 5, and three reverse-motion locks 52 (not shown for simplicity in the drawings) at the right side of the end surface 6.

OPERATION

Upon starting the drive system 10, a force acting in the direction of the longitudinal axis 8 will be transferred to the connecting element 44, which will have a tendency to shift the carriage 3 in a suitable direction. In this motion, the ribbons 25a,25b,25c will be lifted out of the respective grooves 22a, 22b,34 at the leading side of the carriage 3. The carriage 3, with slits 41,42,47 defining guide region 38 for the ribbon 25c, and similar arrangements for the ribbons 25a,25b, slides along the base body 2, raising the respective ribbon out of the respective groove, ahead of the carriage and placing it again in the respective groove at the trailing end.

Friction occurs between the portion of the ribbon 25c located in the interior of the carriage 3 and the corresponding engaged parts of the carriage 3. This friction occurs especially in the region of the bearing elements 39,40, and the connecting element 44. Additionally, an axial force is applied to the ribbon 25c which has the tendency to stretch the portion of the ribbon 25c in the region behind the carriage 3—with respect to the direction of motion of the carriage 3. Similarly, axial forces are applied to the ribbons 25a,25b. This axial force will lead to elastic stretching of the ribbons 25; due to the stretching, the portion of the ribbon 25 which, in the direction of motion of the carriage 3, is in advance of the carriage, is carried along for some distance in the direction of the motion 3 and can be considered to be pushed ahead of the carriage 3. The ribbon 25c, thus, may, as illustrated in FIG. 3, be pushed upon motion of the carriage 3 toward the right between the bridge 54 and the leaf spring 63 over the end surface 6 of the base body 2. The engagement lips 27c,28c will engage in the longitudinal recesses 30c,31c of the grooves 34, yet do not permit formation of a bulge in the ribbon 25c, since the ribbon can slide over the end surface 6.

The portion of the ribbon 25c pushed over the end of the surface 6 is prevented from sliding back, since the leaf spring 63 will tightly engage the ribbon as soon as the ribbon 25c is in quiescent condition. The spring 63 will push the ribbon against the bridge 64 forming a counter element for the spring 63. The inherent resiliency of the ribbon 25c operates the one-way or reverse-motion lock; the ribbon 25 engages and pulls tightly the reverse-motion, or one-way lock 52, so that when tension is applied toward the left—with respect to FIG. 3—the force on the leaf spring 63 by the ribbon 25 is converted into an engagement force directed against the counter element 54. Reverse-motion locks 52a, 52b (not shown), as well as reverse- motion locks 50a, 50b (not shown), operate similarly. If, for example, due to rapid longitudinal movement of the carriage, and rapid sequence of operating strokes, or due to dirt or contamination of the respective ribbons 25a,25b,25c, increased frictional heat occurs, and one or more of the ribbons elongate, the respective reverse-motion locks 50,52 will compensate for the resulting increase in length of the ribbons. Consequently, the ribbons 25 are always retained in tightly stretched, taut condition and securely seated in the respective grooves. Linear motion of the movable element, longitudinally sliding along the respective ribbons 25 result in continuous restretching of the respective ribbon 25. Elongation due to heating, aging, or otherwise caused plastic deformation is accepted by the attachment elements formed as reverse-motion locks.

The reverse-motion locks 50,52 may be arranged in any suitable manner to hold cover ribbons, as well as sealing ribbons, for example to seal longitudinal slits in fluid operated linear cylinders. If necessary, additional sealing elements may be used together with the leaf springs 63, which are matched to the cross-section of the sealing tapes and sealing the linear cylinders towards the outside.

Basically, the reverse-motion lock includes at least one movably retained element forming the locking means itself, the operation of which is controlled by the movement of the ribbon 25 itself. The locking element will have a lock position and a release position, in which axial movement of the cover ribbon 25 is, respectively, blocked, when the blocking element is in its locked position, while permitting axial linear movement of the ribbon in a predetermined direction when the locking element is in its release position. As far as the leaf spring 63 is concerned, the release position is the one in which the ribbon slides in the direction in which the leaf spring faces.

The reverse-motion lock may be so constructed that it cooperates with the ribbon by mechanical engagement therewith. It is, however, also possible to so construct the lock that it is a mixture of force supported engagement and shape controlled engagement. A purely force controlled engagement can be realized by using, for example, a clamping body which has a wedging effect and which clamps the ribbon when tension is applied thereagainst. Such clamping bodies may be rollers, balls, wedges, or the like. Such one-way motion locks, however, have some axial stroke lengths in order to provide for reliably reverse-motion locking, so that some play may result in the operation, which can be noticed by play with respect to the ribbon. A locking lever may be used, for example, which has a free end which is resiliently biased for engagement with the ribbon and which includes an acute angle open with respect to the movable element and with the longitudinal extent of the ribbon. A counter element is provided at the opposite side of the ribbon, against which the ribbon engages and against which the locking element presses the ribbon. When tension is applied to the ribbon in a direction counter the wedge angle, the ribbon will be compressed between the counter element and the locking lever, and thus clamp therein. Use of a leaf spring, consequently, is preferred as a particularly simple reverse-motion lock. The edge of the leaf spring 63 preferably extends transversely to the longitudinal extent of the ribbon and engages at least a portion of the ribbon. This edge may be sharp; it can nick the ribbon 25; it may extend exactly transversely to the ribbon, or the edge can be slightly rounded, as shown by edge 68b, FIG. 5. The rounding of this edge should be very slight, so that the leaf spring will dig into the ribbon to some extent. FIG. 5 shows the rounding greatly exaggerated.

When using locking levers which engage the ribbon by an angle substantially over 45°, it is possible to provide a substantially rounded end for the lever so that the reverse-motion lock then acts essentially only by the clamping effect between the locking lever and the counter element. If the angle is quite sharp, and particularly more acute than 45°, the effect of digging into the ribbon is obtained, particularly when the edge surface 68 of the locking element is essentially at right angles to the longitudinal extent of the ribbon. The enhanced engagement and notching effect results in reliable engagement of the locking device, for example the leaf spring 63 against the ribbon 25, even if the reverse tension is low, or short time. Such arrangements provide for highly reliable engagement of the ribbon with the entire reverse-motion lock, and provide for highly effective clamping between the movable locking element and the counter, in the example the bridge Various changes and modifications may be made and any features described herein may be used with any of the others, within the scope of the inventive concept.

I claim:

1. Guide system (1) for guiding a movable element (3) along a predetermined elongated path between a first end (5) and a second end (6) thereof, said system having a hollow base body (2) formed with an elongated opening (34) extending essentially along the length of said path;

a connecting element (39,40,44) extending through said opening (34) and into the interior (36) of the base body, coupled to said movable element (3); and an elongated tape or ribbon (25) extending over and covering said opening (34), and comprising a reverse-motion lock (50,52) located at least at one of said ends (5,6) of said path, coupled to the base body (2), holding and engaging said tape or ribbon (25), said reverse-motion lock being operative to permit shifting of said tape or ribbon (25) with respect to said lock (50,52) in a first direction, in which said tape or ribbon is free to project beyond said path, but inhibiting shifting of said tape or ribbon in a second direction, opposite to said first direction, and blocking movement of said tape in said second direction.

2. The system of claim 1, wherein said reverse-motion lock is positioned and constructed to retain the tape or ribbon (25) tightly stretched or taut against said opening (34) and, simultaneously, forms an attachment means for the tape or ribbon at the end of said path.

3. The system of claim 1, wherein the system includes two reverse-motion locks (50,52), each of which is located at a respective end (5,6) of said path.

4. The system of claim 1, wherein said reverse-motion lock is located for operatively locking said tape or ribbon (25) to the base body (2).

5. The system of claim 1, wherein said reverse-motion lock is operative to lock said tape in position, when moving in said first direction, essentially without play.

6. The system of claim 1, wherein said reverse-motion lock is a stepless lock.

7. The system of claim 1, wherein said reverse-motion lock (50,52) comprises a locking element (63) engaging said tape or ribbon (25) and operated between a locked and unlocked position by said tape or ribbon, said locking element being movable and moved in locked position upon tension of said tape or ribbon (25) being applied to said movable element in said second direction, while permitting movement of said tape or ribbon (25) in said first direction by positioning said locking element into a release position.

8. The system of claim 7, wherein said locking element (63) comprises a movable locking lever means having a free end (68) which resiliently engages said tape or ribbon, said lever means forming an acute angle with the tape or ribbon (25) in the direction towards a movable element (3).

9. The system of claim 8, wherein said locking element comprises a leaf spring retained at one end in the base body, the free end of which engaging the tape or ribbon (25) with bias force.

10. The system of claim 9, wherein the leaf spring (63) includes an acute angle with the tape or ribbon (25) open towards the movable element (3).

11. The system of claim 10, wherein said acute angle is about 45°.

12. The system of claim 8, wherein said acute angle is about 45°.

13. The system of claim 7, further including a counter element (54) located on said base body and opposite said movable element, engaged by said tape or ribbon (25), and located to permit engagement of said movable element against said tape or ribbon and pressing it against a counter element, when in locking position.

14. The system of claim 7 wherein the locking element (63) includes an edge (68) extending essentially transversely to the longitudinal extent of the tape or ribbon (25) and, at least in part, engaging said tape or ribbon.

15. The system of claim 14, wherein said edge (68) has a slight rounding or bowing (68b), and said locking element (63) resiliently engages the tape or ribbon (25) with resilient bias of said locking element (63) against the tape or ribbon.

16. The system of claim 14, wherein the locking element (63) defines a flat surface, terminating in an edge (68a), said edge forming an acute angle or a right angle with respect to the flat surface of the locking element (63).

17. The system of claim 16, wherein the end edge (68) of said locking element (63) extends essentially at the right angle to the longitudinal extent of the tape or ribbon (25).

18. The system of claim 1, wherein the tape or ribbon (25) comprises a cover tape or ribbon which covers said elongated opening (34), except in the region of the connecting element (39, 40, 44).

19. The system of claim 1, wherein the tape or ribbon (25) comprises a sealing tape or ribbon which seals and covers the elongated opening (34) throughout its entire length, except in the region of the connecting element (39,40,44).

20. The system of claim 1, wherein the tape or ribbon has a surface which is at least slightly deformable upon engagement by said reverse-motion lock (50,52), and comprises a thermoplastic tape or ribbon.

* * * * *